May 8, 1962 S. FINE ET AL 3,034,055
AUTOMATIC PULSE HEIGHT ANALYSIS
Filed Dec. 15, 1958

INVENTORS.
SAMUEL FINE
BY CHARLES F. HENDEE

AGENT.

3,034,055
AUTOMATIC PULSE HEIGHT ANALYSIS
Samuel Fine, New York, and Charles F. Hendee, Hartsdale, N.Y., assignors to North American Philips Company, Inc., New York, N.Y., a corporation of Delaware
Filed Dec. 15, 1958, Ser. No. 780,525
11 Claims. (Cl. 324—102)

This invention relates to apparatus and methods for analyzing the heights of electrical pulses, and more particularly to apparatus and methods which utilize a pulse height analyzer for counting the numbers of pulses having heights falling within one or more predetermined amplitude ranges. This is generally known in the art as obtaining a pulse height distribution.

The pulse-height analyzer is an instrument well known in the electronic arts, and is used to count the numbers of pulses whose amplitudes fall within certain amplitude ranges. A typical pulse-height analyzer is provided with two variable controls; a "baseline control" knob which sets a threshold voltage value so that only pulses which exceed this value will be counted, and a "window height control" knob which sets an upper amplitude limit on the pulses that will be counted. The combination of the baseline setting and the window height setting provides that only pulses falling within the amplitude range given by these two settings will be counted. A typical use of a pulse height analyzer is to analyze, or count, the distribution of the amplitudes of the output pulses produced by a radiation detector tube. Such an analysis provides information from which the type of radiation can be determined. Frequently a motor driven recording chart mechanism is provided at the output of a pulse height analyzer for automatically providing a visual record of the pulse height distribution.

It is frequently desirable to count the pulse distribution over a range of baseline variation, and over a range of window heights. A typical procedure for accomplishing this, is to set the baseline control at a certain setting, and then gradually vary the window height control over a desired range. This is followed by setting the baseline control at a different setting, and then repeating the gradual variation of the window height control. Alternatively, the window height control can be set at different predetermined values, and the baseline control can be varied over a desired range for each of the window height control settings. These conventional methods, although they provide a complete analysis of pulse height distribution, are tedious and time consuming.

An object of the present invention is to provide improved apparatus, and an improved method, for analyzing pulse heights.

Another object is to provide an apparatus and method for automatically varying the relative instantaneous settings of the baseline and window height so that at any instant the window height is a desired mathematical function of the baseline.

Still other objects will be apparent.

In accordance with the present invention, the baseline control shaft and the window height control shaft of a pulse height analyzer are driven simultaneously at a predetermined relative speed, so that both the baseline and the window height of the pulse height analyzer are varied simultaneously in a predetermined manner. Thus, a complete pulse analysis can be made relatively quickly and in a single operation, as compared with the laborious step by step method of the prior art. This invention achieves the improved advantage of varying the relationship between the baseline and window height in either a linear manner or in a square-root or other mathematical manner.

Figure 1:
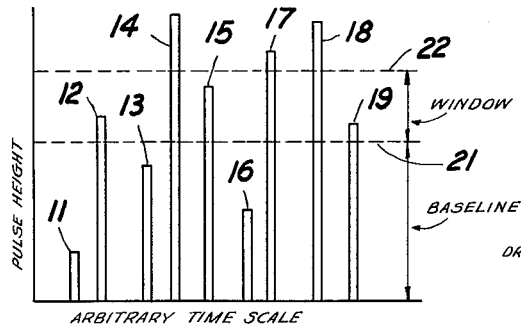
FIG. 1 is a graphical representation of a set of pulses which are to be analyzed.

In FIG. 1, the various pulses 11—19 represent a group of pulses which are to be analyzed; such a group of pulses may be provided by a radiation detector tube. These pulses are fed to the input of a pulse height analyzer, in which a baseline control adjusts the height of the baseline 21 and a window height control adjusts the upper level 22 of the window height. At the baseline and window settings shown in FIG. 1, it will be seen that the pulses 12, 15 and 19 will be counted, whereas the remaining pulses will not be counted because they do not fall within the window height setting. By varying the settings of the baseline and window height, the other pulses will be counted and may be plotted or recorded in a manner which will indicate the pulse height distribution, from which the intensities of the radiation may be determined.

Figure 2:
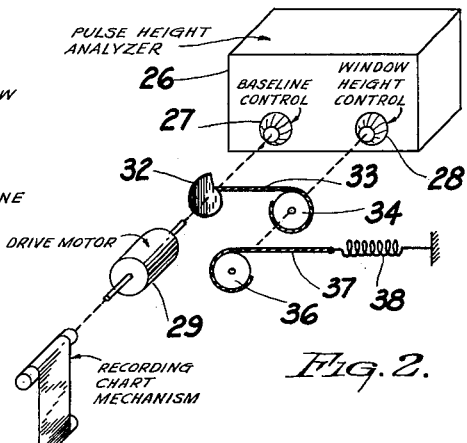
FIG. 2 illustrates a preferred embodiment of the invention.
Figure 6:
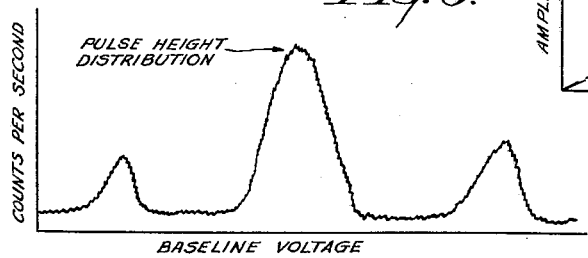
FIG. 6 is a graph of a typical pulse height distribution.

In FIG. 2, a pulse height analyzer 26 which may be of a conventional type, is provided with a baseline control 27 and a window height control 28. A drive-motor 29 is mechanically coupled to the baseline control 27, and is also mechanically coupled to a recording chart mechanism 31 of a conventional type. The output signal of the pulse height analyzer 26 is connected in conventional manner (not shown) to a recording stylus of the recording chart mechanism 31. The recorded pulse-height distribution will appear as shown in FIG. 6. A cam member 32 is mechanically coupled to the drive-motor 29, and is linked by means of a cord 33 or other suitable linkage means, to a drive disc 34 which is mechanically coupled to the window height control 28. A take-up mechanism may be provided, if desired, comprising a disc 36 coupled to the window height control 28, and a cord 37 extending around the disc 36 and attached to a take-up spring 38.

The apparatus of FIG. 2 functions as follows. When it is desired to take a reading of a pulse height distribution, the drive-motor 29 is actuated so as to cause the baseline level to be varied over a suitable amplitude range and at a suitable speed with respect to the frequency of occurrence of the pulse to be analyzed. The window height control 28 will be automatically varied at a desired speed with respect to the baseline control 27, as determined by the shape of the cam 32. During this operation, the recording chart mechanism will record the pulse height distribution. The cam member 32 will have a circular periphery if a linear realtionship is desired between the baseline control 27 and the window height control 28, and will have other shapes accordingly as other mathematical relationships are desired between the two controls 27 and 28.

Figure 3:
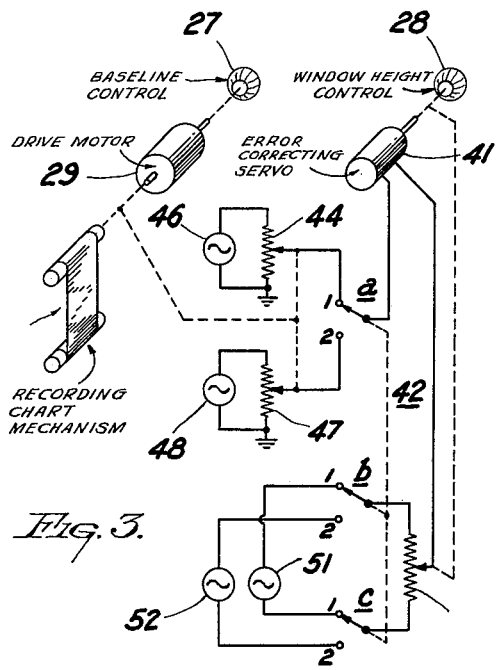
FIG. 3 illustrates an alternative embodiment of the invention.

In the more refined embodiment of the invention shown in FIG. 3, a switch is provided for causing the window height-baseline control relationship to vary. The baseline control 27 is driven by the drive-motor 29, and the drive-motor 29 also drives a recording chart mechanism 31. An error correcting servo 41 is mechanically connected to the window height control 28. One input terminal of the error correcting servo 41 is connected to a common terminal of section a of a function switch 42, and another input terminal of the error correcting servo 41 is connected to an adjustable tap of an error output potentiometer 43. A linear potentiometer 44, having a linear electrical taper, is connected across a source of alternating voltage 46 and the adjustable tap thereof is connected to terminal No. 1 of the switch section 42a. A square-root potentiometer 47, having a square-root electrical taper, is connected across a source of alternating voltage 48, and the adjustable tap thereof is connected to terminal No. 2 of the switch section 42a. The switch sections 42b and 42c connect the error output potentiometer 43 across a first source 51 of reference voltage when in the No. 1 position and across a second source 52 of reference voltage when in the No. 2 position.

When the function switch 42 is in its No. 1 position, the window height control will be varied by the servo 41 linearly with respect to the baseline control, due to the effect of the linear potentiometer 44. When the function switch 42 is in its No. 2 position, the window height control 28 will be varied by the servo 41 as a function of the square root of the baseline control variation, due to the effect of the square root potentiometer 47. The votlage sources 51 and 52 provide reference voltages for proper operation of the error correcting servo 41 in the two positions of the switch 42. It desired, the apparatus shown can be expanded to include additional control potentiometers having different mathematical electrical tapers, or other electrical tapers can be substituted for those which have been described for the potentiometers 44 and 47.

Figure 4:
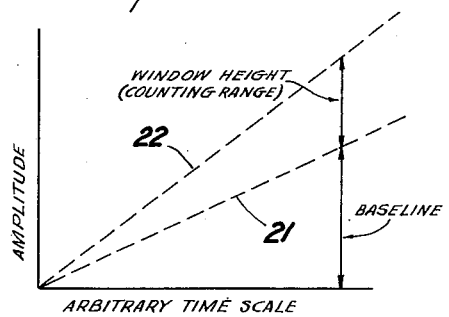
FIGS. 4 and 5 are graphs illustrating the operation of the apparatus of FIG. 3.

FIG. 4 illustrates graphically the linear variation of the window height with respect to baseline variation when the function switch 42 is in its No. 1 (linear) position.

Figure 5:
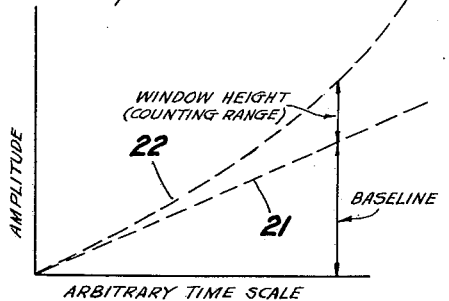

FIG. 5 illustrates graphically the square root variation of the window height with respect to baseline variation, when the function switch is in its No. 2 (square root) position.

It will be appreciated that the apparatus and method of the invention provide expedient, orderly analysis of pulse heights, and the embodiment shown in FIG. 3 readily provides for the selection of a desired functional relationship between the baseline and window height when performing a pulse height analysis. Such an analysis is obtained quickly and automatically by means of the invention, whereas in the past such an analysis has required the tedious steps of obtaining several sets of readings at fixed window heights or at fixed baseline levels, and then plotting the results onto a final composite graph.

While preferred embodiments of the invention have been shown and described, various other embodiments and methods thereof will appear to those skilled in the art and will fall within the scope of invention as defined in the following claims.

What we claim is:

1. Apparatus for analyzing the heights of electrical pulses, comprising a pulse-height analyzer having a baseline control and a window height control, and means connected for continuously simultaneously varying said controls in a predetermined mathematical relationship.

2. Apparatus for analyzing the heights of electrical pulses, comprising a pulse-height analyzer having a baseline control and a window height control, means connected to continuously vary said baseline control, and a cam member coupled mechanically between said controls to cause said window height control to vary in a predetermined mathematical relationship with respect to variation of said baseline control.

3. A method for analyzing the heights of electrical pulses by means of a pulse-height analyzer having a baseline control and a window height control, comprising the steps of feeding said pulses to said pulse height analyzer and continuously varying said baseline control and said window height control simultaneously in a predetermined mathematical relationship.

4. Apparatus for analyzing the heights of electrical pulses, comprising a pulse-height analyzer having a baseline control and a window height control, means connected to continuously vary a first one of said controls, electrical drive means connected to vary the second one of said controls, a source of voltage, and a potentiometer coupled mechanically to said first control and connected electrically between said source of voltage and said electrical drive means whereby the electrical taper of said potentiometer determines the relative variation between said controls.

5. Apparatus for analyzing the heights of electrical pulses, comprising a pulse-height analyzer having a baseline control and a window height control, means connected to continuously vary a first one of said controls, electrical drive means connected to vary the second one of said controls, a source of voltage, a plurality of potentiometers coupled mechanically to said first control and having different electrical tapers, and means for selectively connecting a chosen potentiometer between said source of voltage and said electrical drive means whereby the electrical taper of said chosen potentiometer determines the relative variation between said controls.

6. Apparatus as claimed in claim 6, including an error output potentiometer coupled mechanically to said second control and connected electrically to said electrical drive means.

7. Apparatus for analyzing the heights of electrical pulses, comprising a pulse-height analyzer having a baseline control and a window height control, means connected to continuously vary a first one of said controls, electrical drive means connected to vary the second one of said controls, a first source of voltage, a first potentiometer coupled mechanically to said first control and connected electrically between said first source of voltage and said electrical drive means, a second source of voltage, and a second potentiometer coupled mechanically to said second control and connected electrically between said second source of voltage and said electrical drive means, whereby said second control is driven with respect to said first control in accordance with a function determined by the electrical taper of said first potentiometer.

8. Apparatus for analyzing the heights of electrical pulses, comprising a pulse-height analyzer having a baseline control and a window height control, means connected to continuously vary a first one of said controls, electrical drive means connected to vary the second one of said controls, a plurality of potentiometers each having an adjustable tap coupled mechanically to said first control and each having a different electrical taper, means for applying voltage across each of said potentiometers, and switch means for selectively connecting the tap of a chosen potentiometer to said electrical drive means whereby the electrical taper of said chosen potentiometer determines the relative variation between said controls.

9. Apparatus as claimed in claim 8, including an error output potentiometer having an adjustable tap coupled mechanically to said second control, means for applying a voltage across said error output potentiometer, and means electrically connecting the tap of said error output potentiometer to said electrical drive means.

10. Apparatus as claimed in claim 9, including means connected to vary the value of the voltage applied across said error output potentiometer in accordance with which of said plurality of potentiometers is chosen.

11. Apparatus for analyzing the heights of electrical pulses, comprising a pulse-height analyzer having a baseline control and a window height control, and means comprising a cam member coupled mechanically between said controls for continuously simultaneously varying said controls in a predetermined mathematical relationship.

References Cited in the file of this patent

UNITED STATES PATENTS

| | | |
|---|---|---|
| 2,779,869 | Gerks | Jan. 29, 1957 |
| 2,849,183 | Kuck | Aug. 26, 1958 |
| 2,860,242 | Test | Nov. 11, 1958 |

FOREIGN PATENTS

| | | |
|---|---|---|
| 1,002,499 | France | Oct. 31, 1951 |

OTHER REFERENCES

"Pulse Amplitude in Nuclear Research, part II"; article in Nucleonics, August 1952, pages 22–28.

UNITED STATES PATENT OFFICE
CERTIFICATE OF CORRECTION

Patent No. 3,034,055                             May 8, 1962

Samuel Fine et al.

It is hereby certified that error appears in the above numbered patent requiring correction and that the said Letters Patent should read as corrected below.

Column 4, line 33, for the claim reference numeral "6" read -- 5 --.

Signed and sealed this 9th day of October 1962.

(SEAL)
Attest:

ERNEST W. SWIDER
Attesting Officer

DAVID L. LADD
Commissioner of Patents